US010272653B2

(12) United States Patent
Zou et al.

(10) Patent No.: US 10,272,653 B2
(45) Date of Patent: Apr. 30, 2019

(54) SURFACE TREATMENT COMPOSITION, INSULATING FIBER, YARN, ROPE AND PREPARATION METHOD THEREOF

(71) Applicants: STATE GRID HUNAN ELECTRIC POWER COMPANY LIVE WORKING CENTER, Changsha, Hunan (CN); STATE GRID CORPORATION OF CHINA, Beijing (CN); STATE GRID HUNAN ELECTRIC POWER COMPANY, Changsha, Hunan (CN); HUNAN PEACE PROSPERITY ELECTRIC LIMITED, Changsha, Hunan (CN); XINGHUA JIAHUI ELECTRICAL EQUIPMENT LIMITED, Beijing (CN); CHANGZHOU TEXTILE GARMENT INSTITUTE, Jiangsu (CN)

(72) Inventors: Dehua Zou, Changsha (CN); Lanlan Liu, Changsha (CN); Xiaqing Liu, Changsha (CN)

(73) Assignees: STATE GRID HUNAN ELECTRIC POWER COMPANY LIVE WORKING CENTER, Changsha (CN); STATE GRID CORPORATION OF CHINA, Beijing (CN); STATE GRID HUNAN ELECTRIC POWER COMPANY, Changsha (CN); HUNAN PEACE PROSPERITY ELECTRIC LIMITED, Changsha (CN); XINGHUA JIAHUI ELECTRICAL EQUIPMENT LIMITED, Beijing (CN); CHANGZHOU TEXTILE GARMENT INSTITUTE, Jiangsu (CN)

( * ) Notice: Subject to any disclaimer, the term of this patent is extended or adjusted under 35 U.S.C. 154(b) by 0 days.

(21) Appl. No.: 15/475,825

(22) Filed: Mar. 31, 2017

(65) Prior Publication Data
US 2017/0370023 A1 Dec. 28, 2017

(30) Foreign Application Priority Data
Jun. 24, 2016 (CN) .......................... 2016 1 0471459

(51) Int. Cl.
*B32B 27/12* (2006.01)
*B32B 27/28* (2006.01)
*D06M 13/513* (2006.01)
*D06M 15/564* (2006.01)
*D06M 15/263* (2006.01)

(52) U.S. Cl.
CPC .............. *B32B 27/12* (2013.01); *B32B 27/28* (2013.01); *D06M 13/513* (2013.01); *D06M 15/263* (2013.01); *D06M 15/564* (2013.01)

(58) Field of Classification Search
None
See application file for complete search history.

(56) References Cited

U.S. PATENT DOCUMENTS

| | | | | |
|---|---|---|---|---|
| 5,334,420 A * | 8/1994 | Hartung | ................. | B05D 7/532 427/407.1 |
| 5,494,980 A * | 2/1996 | Buter | .................. | C08F 283/008 523/201 |
| 5,916,965 A * | 6/1999 | Matsumoto | ......... | C08F 290/147 524/507 |
| 2004/0167252 A1* | 8/2004 | Melchiors | ........... | C08F 283/006 524/13 |
| 2006/0193988 A1* | 8/2006 | Walter | ..................... | C09D 4/00 427/387 |
| 2007/0185300 A1* | 8/2007 | Kojima | ............... | C08F 299/065 528/44 |

OTHER PUBLICATIONS

Abstract for CN 105238246 A (no date).*
Abstract for CN 105273603 A (no date).*
Machine translation of CN 105238246 A into English (no date).*
Machine translation of CN 105273603 A into English (no date).*

* cited by examiner

*Primary Examiner* — Marc S Zimmer
(74) *Attorney, Agent, or Firm* — Vidas Arrett & Steinkraus P.A.

(57) ABSTRACT

The present invention discloses a fiber surface treatment composition, characterized in that the composition is comprised of a silane coupling agent, a polymer and a water repellent agent, wherein the polymer is a copolymer of a polyurethane/acrylic acid polymer, wherein the acrylic polymer is selected from the group consisting of polyacrylic acid, polyacrylates or acrylic acid-acrylic acid ester copolymers. The invention also discloses an insulating fiber having the composition on its surface, the preparation method for it, and an insulating yarn and an insulated cord. The insulated fibers, yarns and ropes of the invention have the advantages of moisture resistance, washing resistance, ultraviolet aging resistance and the like. Particularly, the insulated ropes can be applied to the charging work of transmission lines, especially the UHV transmission lines.

14 Claims, No Drawings

SURFACE TREATMENT COMPOSITION, INSULATING FIBER, YARN, ROPE AND PREPARATION METHOD THEREOF

TECHNICAL FIELD

The invention relates to the technical field of polymer materials, in particular to surface treatment composition, insulating fiber, yarn, rope and preparation methods thereof.

BACKGROUND

Currently, insulating ropes available at the market are mainly prepared by weaving and stranding silk or synthetic fiber. In the field of live working, given requirements for the insulation property and deformation of ropes, silk ropes and synthetic fiber ropes are mainly adopted. The damp-proof treatment of silk ropes and synthetic fiber ropes generally adopts physical attachment via damp-proof agents instead of chemical bond connection, so after being washed for certain times, the damp-proof performance of the ropes is reduced significantly, leading to a short service life. Furthermore, with erection of UHV transmission lines, the size and weight of various fittings on the transmission lines increase, while the fittings need to be lifted in the live working process; however, the strength of the existing silk ropes and synthetic fiber ropes cannot meet requirements of live working to some extent, and as a result, some working projects fail to proceed successfully.

Therefore, it is necessary to develop new insulation ropes for live working. Compared with the silk ropes and existing synthetic fiber ropes, the new insulation ropes should have better and more stable damp-proof performance, higher strength and better ultraviolet aging resistance. The novel high-strength, damp-proof and ultraviolet aging resistant insulation ropes can transfer large-tonnage stress of the live working items on a tower onto the ground, thereby reducing the labor intensity of operators on the tower and ensuring working safety. The successful development of the insulation ropes will bring the third revolution of UHV live working.

PBO fiber is a polyparaphenylene benzobisoxazole fiber whose fibrils are composed of PBO molecular chains orienting in the direction of the fiber axis with diameter between 10 and 50 nm and there are many capillary pores between the fibrils, which are connected to each other by means of cracks between the fibrils or openings of the fibrils.

PBO fiber has a perfect comprehensive performance, known as ultra-high performance fibers of the new era. Its tensile strength, monofilament strength of up to 5 Gpa, the tensile modulus of up to 300 Gpa, is twice that of the para-aramid fiber and 10 times that of the steel wire of the same diameter, and its density is only ⅕ of steel wire. The wear resistance on metal is better than that of aramid fiber, and the deformation coefficient is small, its thermal expansion coefficient is only −6 ppm/° C. The thermal degradation temperature in the air is about 650° C., and 700° C. in the nitrogen or argon gas environment, which is 100° C. higher than the aramid fiber; the limit of oxygen index of the PBO fiber is 68, highest among the polymers; it is smoldering even in open flame, so that it has self-flame retardancy. In addition, it has high impact resistance, and the energy needed to penetrate through its fabric is 2 times as much as that for penetrating Kevlar fiber. Therefore, PBO fiber is not only widely used in fields of national defense, aerospace and other advanced fields, but also can be widely applied to replace the conventional industrial production process and the upgrades of products with high temperature resistance, flame retardant, high performance, such as fiber reinforced material, high tensile strength such as rope or cable material, bridge cable, cable, sailing sailboat the operating lever and rowing with canvas, bullet-proof vests, nautical clothing, anti-high temperature & cut resistant gloves, high temperature and high pressure resistant gloves, PBO fiber composite materials are applied to aircrafts, space crafts, rocket outer structures and internal force bearing structures.

Given its excellent mechanical property and heat stability, BPO fiber becomes the first choice for insulation ropes for live working. Although PBO fiber has many advantages, there are still some serious drawbacks, such as PBO fiber is highly hydroscopic, and prone to deep fibrillation after damp, resulting in slip of PBO fibrils, and a sharp decline in mechanical properties; in addition, PBO fiber in the ultraviolet light irradiation can be prone to rapid aging phenomenon. The existence of these defects makes the PBO fiber rope's life shorter and cost higher, and severely limits its scope of application.

The surface treatment measures commonly used in the prior art is to deal with the PBO fiber with the help of a waterproofing agent and an ultraviolet absorber, or a shield agent. However, due to the absence of weak chemical bonds in the PBO molecular structure and a lack of the active groups, its surface is smooth and the free energy is low, making it difficult to connect with other functional groups, such as waterproofing group, anti-ultraviolet radiation group, etc. Therefore, these prior art methods have no obvious effects, and it is difficult to effectively solve the technical problems such as easy moisture absorption, decrease of strength and rapid aging in outdoor application.

SUMMARY

In order to solve the above technological problems, the invention aims to provide a surface treatment composition for insulating fiber, the insulating fiber obtained by surface treatment of the composition, and the preparation method thereof.

The invention also aims to provide an insulating yarn and an insulating rope prepared by the insulating fiber.

Based on the above purposes, the first aspect of the present invention provides a fiber surface treatment composition comprising a silane coupling agent, a polymer and a water-proofing agent, wherein the polymer is a copolymer of a polyurethane/polyacrylics, and the polyacrylics are selected from polyacrylic acid, polyacrylates or acrylic acid-acrylic ester copolymers.

In a preferred specific embodiment, the polymer may be a core-shell structure in which the core is a polyurethane and the shell is an polyacrylics.

In a preferred embodiment, when the polyacrylics are selected from polyacrylates or acrylic acid-acrylic ester copolymers, the alcohol forming the acrylic ester in the acrylate monomer is a straight chain alcohol having a carbon chain length of at least carbon atoms, for example, the acrylate monomer may be selected from at least one of octyl acrylate, decyl acrylate, and lauryl acrylate.

In a preferred embodiment, the polymer comprises nanoparticle having a particle size ranging from 5 to 200 nanometers.

In a preferred embodiment, the polymer may be in the form of a polymer suspension or a polymer emulsion, wherein the polymer forms dispersion particles.

In a preferred embodiment, the polyurethane is formed by polymerizing a diisocyanate monomer with a polyol, wherein the diisocyanate monomer may be selected from isophorone diisocyanate.

In a preferred embodiment, the silane coupling agent may be selected from the group consisting of KH series silane coupling agents, for example, at least one selected from KH550, KH560, KH570, and KH792.

In a preferred embodiment, the waterproofing agent may be selected from the group consisting of a perfluor C6 chain waterproofing agent and a perfluor C8 chain waterproofing agent.

In a preferred embodiment, the composition further comprises a cationic dye, which may be selected from at least one of C. I. Basic Yellow 24 and C. I. Basic Yellow 28.

The second aspect of the present invention provides an insulating fiber, wherein the insulating fiber has said composition adhered on the surface of the insulating fiber.

In a preferred embodiment, the insulating fiber is selected from polyparaphenylene benzobisoxazole (PBO) fiber.

In a preferred embodiment, the composition on the surface of the insulating fiber comprises 1 to 20% by weight of the insulating fiber.

In a preferred embodiment, the waterproofing agent on the surface of the insulating fiber comprises 1 to 18% by weight of the insulating fiber.

In a preferred embodiment, the cationic dyes on the insulating fiber comprises 0.001 to 0.002% by weight of the insulating fiber.

The third aspect of the present invention provides a method for preparing the insulating fiber as claimed in the second aspect of the present invention, including the steps as follows:
1) contacting the composition with a fiber to make the composition to be adhered to the surface of the fiber; and
2) baking the fiber to which the composition is attached.

The fiber may be polyparaphenylene benzobisoxazole (PBO) fiber.

In a preferred embodiment, the step of contacting comprises impregnating the fiber sequentially in the silane coupling agent, the polymer emulsion and the waterproofing agent.

In a preferred embodiment, the step of contacting comprises impregnating the fiber in a mixture of the silane coupling agent and the polymer emulsion, and then washing, drying and finally immersing the fiber in the waterproofing agent.

In a preferred embodiment, the step of contacting is carried out at a temperature of about 100 to 130° C. and for about 60 to 120 minutes.

In a preferred embodiment, the baking temperature is 180-250° C.

The fourth aspect of the present invention relates to an insulating yarn which can be made of the insulating fiber in the second aspect of the present invention through textile processing.

As an alternative, the insulating yarn may also be made by a method comprising the steps as follows:
1) processing a fiber into a yarn;
2) contacting the composition with the yarn to make the composition to be adhered to the surface of the yarn; and
3) baking the yarn to which the composition is adhered, to obtain the insulated yarn.

In a preferred embodiment, the fiber is polyparaphenylene benzobisoxazole (PBO) fiber.

The fifth aspect of the present invention relates to an insulating rope which can be made of the insulating yarn in the fourth aspect of the present invention.

In an alternative embodiment, the insulating rope can also be made through a method comprising the steps as follows:
1) processing the fiber into a yarn by weaving;
2) processing the yarn into a 12-strand loose primary rope;
3) contacting the 12-strand loose primary rope with the composition, so that the composition is adhered to the surface of the 12-strand loose primary rope;
4) baking the 12-strand loose primary rope to which the composition is attached, to obtain a 12-strand loose insulated primary rope; and
5) subjecting the 12-strand loose insulated primary rope to a shaping treatment, and wrapping it with the insulating yarn in the fourth aspect of the present invention to obtain the insulating rope.

In a preferred embodiment, the fiber is polyparaphenylene benzobisoxazole (PBO) fiber.

Technical Effect

The fiber surface treatment composition of the invention comprises a silane coupling agent, a polymer and a waterproofing agent, and the synergistic effect is produced by the interaction among them, which can effectively solve the technical problems in the prior art.

The specific functions of the individual components of the above compositions are described as follows:

Silane Coupling Agent:
1) It can prevent the occurrence of fibrillation slip. PBO fiber due to its own chemical structure has the tendency to fibrillate, thus the use of silane coupling agent for its surface treatment can significantly reduce this trend. The —SiOH group formed by hydrolysis of the silane coupling agent can form chemical bonds with N atom and form hydrogen bonding with O atoms on the fiber to form cross-links between the microfibrils and prevent the fibrillation slip of the fibrils. This effect is conducive to maintaining strength.
2) It provides active sites for the attachment of the polymer to the surface of the fiber. Residual reactive groups such as $-NH_2$, $-OH$, $-OC_2H_5$ and the like after hydrolysis of the silane coupling agent can react with residues on the latex particles of the polymer emulsion, such as a carboxyl group, to form an amide bond, an ester bond, etc., thereby providing sites at which the polymer can be attached to the surface of the fiber.

Polymer:
3) The polyurethane part of the polymer has good film-forming and coating property, and can play the role of physical protection and water barrier.
4) The polyacrylic acid moiety in the polymer or the anionic groups introduced on the fiber by the hydrolysis of polyacrylates, such as $-COO^-$, is advantageous for the cationic waterproofing agent such as a perfluor C6 chain waterproofing agent and a perfluor C8 chain waterproofing agent being adsorbed or bonded thereto. This effect enhances the adhesion of the waterproofing agent to the fiber surface, and improves the washing resistance and the durability of the waterproofing performance of the fiber.
5) Due to the film forming and coverage of the polymer on the fiber surface, it can significantly change the refractive index and is conducive to increasing the reflection and refraction of UV light, thereby enhance the fiber's ability to resist UV.

Waterproofing Agent:
6) The bonding rate and the binding amount of the weak cationic/cationic water repellent adhering to the surface of the fiber can be remarkably increased due to the presence of the anionic polymer on the fiber surface, thereby remarkably improving the water repellency of the fiber. In addition, the adhesion force between the waterproofing agent and the polymer is remarkably higher than that of the waterproofing agent and the surface in the prior art, thus the washing resistance of the fiber can be remarkably improved.

In a further preferred embodiment, the present invention also has the following advantages:
7) The polymer in the composition takes the form of a polymer emulsion which facilitates the stability of the polymer, prevents coagulation when mixed with other components, and facilitates the control of the particle size distribution.
8) Due to the large number of nano-pores between the PBO fibrils, nanometer-size polymer particles can effectively fill these pores, effectively increasing the contact area between the polymer and PBO fibrils.
9) Since the waterproofing agent is bonded to the acrylic group of the polymer so that the water repellent molecules are sandwiched between the side chains of the acrylate segments, and when the side chains are above C8, it can advantageously improve the water repellent capacity of the waterproofing agent, in particular, can remarkably improve the water repellency of the perfluor C6 chain waterproofing agent.

Waterproofing agents commonly used in the art are perfluor C6 chain waterproofing agent and perfluor C8 chain waterproofing agent, wherein the water repellency of the former one is lower than that of the later one. However, PFOS (perfluorooctane sulfonyl compounds) and PFOA (perfluorooctanoic acid) are produced by perfluor C8 chain waterproofing agent and the European Union has completely banned the use of chemicals containing PFOS and PFOA, so the use of the perfluor C8 chain waterproofing agent has been greatly limited. The invention can improve the water repellency of the perfluor C6 chain waterproofing agent by clamping the waterproofing molecules with at least C8 side chains on the polymer so as to effectively replace the perfluor C8 chain waterproofing agent by using the perfluor C6 chain waterproofing agent.
10) Polyurethane synthesized from isophorone diisocyanate and polyol has excellent resistance to ultraviolet radiation, which is conducive to preventing fiber ultraviolet aging.
11) The coverage of fiber yarn on 12-strand loose primary fiber rope can further enhance the wear resistance and moisture resistance of insulating rope.

The present invention overcomes the drawbacks of the prior art and provides a fiber surface treatment composition capable of remarkably improving the moisture resistance and UV resistance of the fiber, and the insulating fiber obtained by the surface treatment of the composition. The invention can be applied to the large scale industrial process to produce qualified products, and thoroughly breaks through the previous technical dilemma and barriers. The damp-proof insulating rope made by the PBO fiber is easy to store and transport and safe to use, and is a high-strength insulation rope for live working capable of being used in high-humidity environment.

The key technical principle of the invention is that through waterproof treatment on the fiber, strength reduction caused by relative slippage of fibril after fiber absorbing water molecules is prevented; by anionic coating and shielding on fiber surfaces through the mixed conditioning fluid, the refractive index can be changed; after adding a tiny amount of high light-resistant cationic dyes to absorb and transfer ultraviolet light energy, the anti-ultraviolet performance of BPO fiber is improved.

The preparation method has the advantages of having a simple process and operation convenience. The insulated wire obtained in this way can be greatly improved in strength, moisture resistance, UV resistance, and the like, and can be suitable for large-scale industrial production.

DETAILED DESCRIPTION

In order that the objects, technical solutions and advantages of the present invention will become more apparent, the present invention will be described in more detail with reference to specific embodiments.

Example 1—Preparation of Aqueous Polyurethane/Polyacrylic Acid-Octyl Acrylate Nanoemulsion Adding 50 g of polyethylene glycol into a 3-mouth flask, removing water by extraction filtration for 2 h at 110° C., then cooling to 80° C., adding 100 g of isophorone diisocyanate, pumping with nitrogen, and stirring at constant temperature for 2 h; cooling to 70° C., adding 9 g of dimethylolpropionic acid, 1.5 g of trimethylolpropane, 300 ml of solvents of N-methyl-2-pyrrolidinone and acetone, and appropriate amount of catalyst of dibutyltin dilaurate, heating to 80° C. to react for 7 h, stopping nitrogen, cooling to 60-65° C., adding triethylamine for terminating, keeping constant temperature for 4 h, cooling to 50° C. and adding triethylamine for neutralization for 20 min; adding distilled water to stir and emulsify for 2-3 h at room temperature to obtain milky white semitransparent emulsion; removing acetone by extraction filtration at 65° C. for 1-2 h, and then adding equivalent of deionized water to stir for 10 min; heating to 80-85° C. in the condition of stirring and nitrogen, slowly dripping 10 g of acrylic acid, 20 g of octyl acrylate monomer and initiator of azobisisobutyronitrile (total for about 2 h), keeping constant temperature for 4 h, then cooling to 50-60° C., adding emulsifiers Span 80 and Tween 80 for stirring and emulsifying, till the emulsion is blue transparent, discharging to obtain waterborne polyurethane/polyacrylic acid-octyl acrylate nano-emulsion, with particle size distributed in a range of 50-100 nanometers.

Example 2—Preparation of Aqueous Polyurethane/Polyacrylic Acid-Decyl Acrylate Nanoemulsion Adding 50 g of polyethylene glycol into a 3-mouth flask, removing water for 2 h at 110° C., then cooling to 80° C., adding 100 g of isophorone diisocyanate, pumping with nitrogen, and stirring at constant temperature for 2 h; cooling to 70° C., adding 9 g of dimethylolpropionic acid, 1.5 g of trimethylolpropane, 300 ml of solvents of N-methyl-2-pyrrolidinone and acetone, and appropriate amount of catalyst of dibutyltin dilaurate, heating to 80° C. to react for 7 h, stopping nitrogen, cooling to 60-65° C., and adding triethylamine for terminating, keeping constant temperature for 4 h, cooling to 50° C., and adding triethylamine for neutralization for 20 min; adding distilled water to stir and emulsify for 2-3 h at room temperature to obtain milky white semitransparent emulsion; removing acetone by extraction filtration at 65° C. for 1-2 h, and then adding equivalent of deionized water to stir for 10 min; heating to 80-85° C. in the condition of stirring and nitrogen, slowly dripping 10 g of acrylic acid, 20 g of acrylate monomer and initiator of azobisisobutyronitrile (total for about 2 h), keeping constant temperature for 4 h, then cooling to 50-60° C., adding emulsifiers of Span 80 and Tween 80 for stirring and emulsifying, till the emulsion is blue transparent, discharging to obtain waterborne polyurethane/polyacrylic acid-decyl acrylate nanoemulsion, with particle size distributed in a range of 30-100 nanometers.

Example 3—Preparation of aqueous polyurethane/polyacrylic acid nanoemulsion

Adding 45 g of polyethylene glycol into a 3-mouth flask, filtering water for 2.5 h at 120° C., then cooling to 78° C., adding 95 g of isophorone diisocyanate, pumping with nitrogen, and stirring at constant temperature for 1.8 h; cooling to 72° C., adding 9 g of dimethylolpropionic acid, 1.8 g of trimethylolpropane, 280 ml of solvents of N-methyl-2-pyrrolidinone and acetone, and appropriate amount of catalyst of dibutyltin dilaurate, heating to 75° C. to react for 6.5 h, stopping nitrogen, cooling to 60-65° C., adding triethylamine for terminating, keeping constant temperature for 5 h, cooling to 45° C., and adding triethylamine for neutralization for 20 min; adding distilled water to stir and emulsify for 1-2.5 h at room temperature to obtain milky white semitransparent emulsion; removing acetone by extraction filtration at 62° C. for 1-2 h, and then adding equivalent of deionized water to stir for 15 min; heating to 82-88° C. in the condition of stirring and filling in nitrogen, slowly dripping 32 g of acrylic acid monomer (total for about 2.5 h), keeping constant temperature for 5 h, then cooling to 50-55° C., adding emulsifiers of Span 80 and Tween 80 for stirring and emulsifying, till the emulsion is blue transparent, discharging to obtain the waterborne polyurethane/poly acrylic acid nanoemulsion, with particle size distributed in a range of 5-100 nanometers.

Example 4—Preparation of Aqueous Polyurethane/Poly(Lauryl Acrylate) Nanoemulsion Adding 55 g of polyethylene glycol into a 3-mouth flask, removing water for 1.8 h at 105° C., then cooling to 83° C., adding 105 g of isophorone diisocyanate, pumping with nitrogen, and stirring at constant temperature for 2.5 h; cooling to 65° C., adding 10 g of dimethylolpropionic acid, 1.6 g of trimethylolpropane, 350 ml of solvents of N-methyl-2-pyrrolidinone and acetone, and appropriate amount of catalyst of dibutyltin dilaurate, heating to 82° C. to react for 7.2 h, stopping nitrogen, cooling to 60-65° C., adding triethylamine for terminating, keeping constant temperature for 3.5 h, cooling to 53° C., and adding triethylamine for neutralization for 25 min; adding distilled water to stir and emulsify for 2-2.5 h at room temperature to obtain milky white semitransparent emulsion; removing acetone by extraction filtration at 68° C. for 1.5-2 h, and then adding equivalent of deionized water to stir for 8 min; heating to 85-90° C. in the condition of stirring and nitrogen, slowly dripping 28 g of lauryl acrylate monomer and initiator of azobisisobutyronitrile (total for about 2 h), keeping constant temperature for 3.5 h, then cooling to 53-60° C., adding emulsifiers Span 80 and Tween 80 for stirring and emulsifying, till the emulsion is blue transparent, discharging to obtain the waterborne polyurethane/polyacrylates nanoemulsion, with particle size distributed in a range of 20-200 nanometers.

Example 5—Preparation of a Moisture-Proofing and Fast-Drying PBO Insulating Fiber 1) Evenly mixing 5 kg of aqueous polyurethane/polyacrylic acid-octyl acrylate octyl emulsion and 15 kg of silane coupling agent KH 792 to prepare a mixed conditioning fluid, and soaking 200 kg of PBO fiber into the mixed conditioning fluid, wherein the temperature of the mixed conditioning fluid is controlled at 125° C., and the treatment time is 35 min.
2) Taking out the PBO fiber from the mixed conditioning fluid, washing with water and then drying it; soaking the PBO fiber into 10 kg of perfluor C8 chain waterproofing agents (TG-581), and adding 4 g of C.I.Basic Yellow 28 in the perfluor C8 chain waterproofing agent, wherein the temperature of the perfluor C8 chain waterproofing agent is controlled at 110° C., and the treatment time is 50 min.
4) Baking the waterproof treated PBO fiber at a high temperature to obtain the insulating PBO fiber, wherein the temperature is controlled at 220° C.

Example 6—Preparation of Moisture-Proofing and Quick-Drying PBO Insulation Yarn and Insulating Rope The PBO insulating fiber in example 5 is subjected to a textile processing to form the PBO insulating yarn by stranding and twisting.

The PBO insulating yarn is subjected to further processing such as weaving to obtain an insulating rope. The moisture absorption rate of the insulating rope is 2.43%, after being washed for 10 times and immersed for 15 minutes at 15~20 cm below the water surface; when the harsh conditions of environment temperature at 30° C., relative humidity at 85%, ultraviolet wavelength at 340 nm and the irradiation smaller than or equal to 50 W/m$^2$ are simulated and kept for 150 h, the result of the accelerated aging test is that the tensile strength is reduced by 12.50%.

Example 7—Preparation of Moisture-Proofing and Quick-Drying PBO Insulating Yarn and Insulating Rope 1) Stranding and twisting the PBO fiber to prepare the PBO yarn.
2) Evenly mixing 1.5 kg of waterborne polyurethane/polyacrylic acid-octyl acrylate nano-emulsion prepared in example 1, with 2 kg of silane coupling agent KH 550 and 1 kg of Silane coupling agent KH 570 to prepare the mixed conditioning fluid, and soaking 150 kg of PBO yarn into the mixed conditioning fluid, wherein the temperature of the mixed conditioning fluid is controlled at 115° C., and the treatment time of PBO yarn is 52 min.
3) Taking out the PBO yarn from the mixed conditioning fluid, washing with water and then drying it; soaking the PBO yarn into 22.5 kg of perfluor C6 chain waterproofing agent (TG-5521), and adding 1.95 g of C.I.Basic Yellow 24 in the perfluor C6 chain waterproofing agent, wherein the temperature of the perfluor C6 chain waterproofing agent is controlled at 118° C. and the treatment time is 36 min.
4) Baking the waterproof treated PBO yarn at a high temperature to obtain the insulating yarn, wherein the temperature is controlled at 222° C.

The PBO insulating yarn is subjected to further processing such as weaving to obtain an insulating rope.

The moisture absorption rate of the insulated ropes is 1.21% after being washed for 10 times and immersed for 15 minutes at 15~20 cm below the water surface; when the harsh conditions of environment temperature at 30° C., relative humidity at 85%, ultraviolet wavelength at 340 nm and the irradiation smaller than or equal to 50 W/m² are simulated and kept for 150 h, the result of the accelerated aging test is that the tensile strength is reduced by 10.25%.

Example 8—Preparation of Moisture-Proofing and Quick-Drying PBO Insulating Yarn and Insulating Rope 1) Stranding and twisting the PBO fiber to prepare the PBO yarn.
2) Evenly mixing 1 kg of waterborne polyurethane/polyacrylic acid-decyl acrylate nano-emulsion prepared in example 2, with 10 kg of silane coupling agents KH 550 to prepare the mixed conditioning fluid, and soaking 110 kg of PBO yarn into the mixed conditioning fluid, wherein the temperature of the mixed conditioning fluid is controlled at 120° C. and the treatment time of PBO yarn is 40 min.
3) Taking out the PBO yarn from the mixed conditioning fluid, washing with water and then drying it; soaking the PBO yarn into 12 kg of perfluor C6 chain waterproofing agent (TG-5521), and adding 1.32 g of C.I.Basic Yellow 24 in the perfluor C6 chain waterproofing agent, wherein the temperature of the perfluor C6 chain waterproofing agent is controlled at 130° C. and the treatment time is 45 min.
4) Baking the waterproof treated PBO yarn at a high temperature to obtain the insulating yarn, wherein the temperature is controlled at 200° C.

The PBO insulating yarn is subjected to further processing such as weaving to obtain an insulating rope. The moisture absorption rate of the insulating rope is 1.15%, after being washed for 10 times and immersed for 15 minutes at 15~20 cm below the water surface; when the harsh conditions of environment temperature at 30° C., relative humidity at 85%, ultraviolet wavelength at 340 nm and the irradiation smaller than or equal to 50 W/m² are simulated and kept for 150 h, the result of the accelerated aging test is that the tensile strength is reduced by 8.21%.

Embodiment 9—Preparation of Moisture-Proofing and Quick-Drying PBO Insulating Yarn and Insulating Rope 1) Stranding and twisting the fiber to prepare the PBO yarn.
2) Evenly mixing 7 kg of waterborne polyurethane/polyacrylic acid nano-emulsion prepared in example 3, with 20 kg of silane coupling agents KH 560 to prepare the mixed conditioning fluid, and soaking 150 kg of PBO yarn into the mixed conditioning fluid, wherein the temperature of the mixed conditioning fluid is controlled at 105° C., and the treatment time of the PBO yarn is 60 min.
3) Taking out the PBO yarn from the mixed conditioning fluid, washing with water and then drying it; soaking the PBO yarn into 7.5 kg of perfluor C6 chain waterproofing agent (TG-5521), and adding 1.5 g of C.I.Basic Yellow 24 and 0.6 g C.I.Basic Yellow 28 in the perfluor C6 chain waterproofing agent, wherein the temperature of the perfluor C6 chain waterproofing agent is controlled at 102° C., and the treatment time is 55 min.
4) Baking the waterproof treated PBO yarn at a high temperature to obtain the insulating PBO yarn, wherein the temperature is controlled at 250° C.

The PBO insulating yarn is subjected to further processing such as weaving to obtain an insulating rope. The moisture absorption rate of the insulating rope is 1.56%, after being washed for 10 times and immersed for 15 minutes at 15~20 cm below the water surface; when the harsh conditions of environment temperature at 30° C., relative humidity at 85%, ultraviolet wavelength at 340 nm and the irradiation smaller than or equal to 50 W/m² are simulated and kept for 150 h, the result of the accelerated aging test is that the tensile strength is reduced by 8.4%.

Embodiment 10—Preparation of Moisture-Proofing and Quick-Drying PBO Insulating Yarn and Insulating Rope 1) Stranding and twisting the PBO fiber to prepare the PBO yarn.
2) Evenly mixing 2 kg of waterborne polyurethane/poly(lauryl acrylate) nano-emulsion prepared in example 4, with 2 kg of silane coupling agent KH 550 and 2 kg of silane coupling agent KH 560 to prepare the mixed conditioning fluid, and soaking 50 kg of PBO yarn into the mixed conditioning fluid, wherein the temperature of the mixed conditioning fluid is controlled at 116° C., and the treatment time of PBO yarn is 41 min.
3) Taking out the PBO yarn from the mixed conditioning fluid, washing with water and then drying it; soaking the PBO yarn into 2.5 kg of perfluor C6 chain waterproofing agent (TG-5521), and adding 0.8 g of C.I.Basic Yellow 24 in the perfluor C6 chain waterproofing agent, wherein the temperature of the perfluor C6 chain waterproofing agents is controlled at 128° C., and the treatment time is 45 min.
4) Baking the waterproof treated PBO yarn at a high temperature to obtain the PBO insulating yarn, wherein the temperature is controlled at 180° C.

The PBO insulating yarn is subjected to further processing such as weaving to obtain an insulating rope. The moisture absorption rate of the insulated rope is 1.41% after being washed for 10 times and immersed for 15 minutes at 10~20 cm below the water surface; when the harsh conditions of environment temperature at 30° C., relative humidity at 85%, ultraviolet wavelength at 340 nm and the irradiation smaller than or equal to 50 W/m² are simulated and kept for 150 h, the result of the accelerated aging test is that the tensile strength is reduced by 7.83%.

Embodiment 11—Preparation of Moisture-Proofing and Quick-Drying PBO Insulating Yarn and Insulating Rope 1) Stranding and twisting the PBO fiber to prepare the PBO yarn.
2) Evenly mixing 5 kg of waterborne polyurethane/polyacrylic acid-octyl acrylate nano-emulsion prepared in example 1 with 15 kg of silane coupling agent KH 792 to prepare the mixed conditioning fluid, and soaking 200 kg of PBO yarn into the mixed conditioning fluid, wherein the temperature of the mixed conditioning fluid is controlled at 125° C., and the treatment time of PBO yarn is 35 min.
3) Taking out the PBO yarn from the mixed conditioning fluid, washing with water and then drying it; soaking the PBO yarn into 10 kg of perfluor C8 chain waterproofing agent (TG-581), and adding 4 g of C.I.Basic Yellow 28 in the perfluor C8 chain waterproofing agent, wherein the temperature of the perfluor C8 chain waterproofing agent is controlled at 100° C., and the treatment time is 50 min.
4) Baking the waterproof treated PBO yarn at a high temperature to obtain the PBO insulating yarn, wherein the temperature is controlled at 220° C.

The PBO insulating yarn is subjected to further processing such as weaving to obtain an insulating rope.

The moisture absorption rate of the insulating rope is 1.15% after being washed for 10 times and immersed for 15 minutes at 15~20 cm below water surface; when the harsh condition of environment temperature at 30° C., relative humidity at 85%, ultraviolet wavelength at 340 nm and the irradiation smaller than or equal to 50 W/m² are simulated and kept for 150 h, the result of the accelerated aging test is that the tensile strength is reduced by 8.21%.

Embodiment 12—Preparation of Moisture-Proofing and Quick-Drying PBO Insulating Yarn and Insulating Rope 1) Stranding and twisting the PBO fiber to prepare the PBO yarn.
2) Evenly mixing 10 kg of waterborne polyurethane/polyacrylic acid nano-emulsion prepared in example 3 with 44 kg of silane coupling agent KH 550 to prepare the mixed conditioning fluid, and soaking 300 kg of PBO yarn into the mixed conditioning fluid, wherein the temperature of the mixed conditioning fluid is controlled at 118° C., and the treatment time of PBO yarn is 45 min.
3) Taking out the PBO yarn from the mixed conditioning fluid, washing with water and then drying it; soaking the PBO yarn in 24 kg of perfluor C8 chain waterproofing agent (TG-581), wherein the temperature of the perfluor C8 chain waterproofing agent is controlled at 114° C., and the treatment time is 52 min.
4) Baking the waterproof treated PBO yarn at a high temperature to obtain the PBO insulating yarn, wherein the temperature is controlled at 220° C.

The PBO insulating yarn is subjected to further processing such as weaving to obtain an insulating rope. The moisture absorption rate of the insulating rope is 1.42%, after being washed for 10 times and immersed for 15 minutes at 15~20 cm below water surface; when the harsh conditions of environment temperature at 30° C., relative humidity at 85%, ultraviolet wavelength at 340 nm and the irradiation smaller than or equal to 50 W/m² are simulated and kept for 150 h, the result of the accelerated aging test is that the tensile strength is reduced by 10.18%.

Embodiment 13—Preparation of Moisture-Proofing and Quick-Drying PBO Insulating Yarn and Insulating Rope 1) Stranding and twisting the PBO fiber to prepare the PBO yarn.
2) Evenly mixing 1.5 kg of waterborne polyurethane/polyacrylic acid-decyl acrylate copolymer nano-emulsion prepared in example 2 with 2 kg of silane coupling agent KH 550 and 1 kg silane coupling agent KH 570 to prepare the mixed conditioning fluid, and soaking 150 kg of PBO yarn into the mixed conditioning fluid, wherein the temperature of the mixed conditioning fluid is controlled at 115° C., and the treatment time of PBO yarn is 52 min.
3) Taking out the PBO yarn from the mixed conditioning fluid, washing with water and then drying it; soaking the PBO yarn in 22.5 kg of perfluor C8 chain waterproofing agent (TG-581), and adding 1.95 g of C.I.Basic Yellow 24 in the perfluor C8 chain waterproofing agent, wherein the temperature of the perfluor C8 chain waterproofing agent is controlled at 118° C., and the treatment time is 36 min.
4) Baking the waterproof treated PBO yarn at a high temperature to obtain the PBO insulating yarn, wherein the temperature is controlled at 225° C.

The PBO insulating yarn is subjected to further processing such as weaving to obtain an insulating rope. The moisture absorption rate of the insulating rope is 1.18%, after being washed for 10 times and immersed for 15 minutes at 10~20 cm below water surface; when the harsh conditions of environment temperature at 30° C., relative humidity at 85%, ultraviolet wavelength at 340 nm and the irradiation smaller than or equal to 50 W/m² are simulated and kept for 150 h, the result of the accelerated aging test is that the tensile strength is reduced by 8.33%.

Example 14—Preparation of Moisture-Proofing and Quick-Drying PBO Insulating Yarn and Insulating Rope 1) Stranding and twisting the PBO fiber to prepare the PBO yarn.
2) Evenly mixing 2 kg of waterborne polyurethane/poly(lauryl Alcrylate) nano-emulsion prepared in example 4 with 7.6 kg of silane coupling agent KH 792 to prepare the mixed conditioning fluid, and soaking 80 kg of PBO yarn into the mixed conditioning fluid, wherein the temperature of the mixed conditioning fluid is controlled at 112° C., and the treatment time of PBO yarn is 38 min.
3) Taking out the PBO yarn from the mixed conditioning fluid, washing with water and then drying it; soaking the PBO yarn in 4 kg of perfluor C8 chain waterproofing agent (TG-581), and adding 1.04 g of C.I.Basic Yellow 28 in the perfluor C8 chain waterproofing agent, wherein the temperature of the perfluor C8 chain waterproofing agent is controlled at 122° C., and the treatment time is 48 min.
4) Baking the waterproof treated PBO yarn at a high temperature to obtain the PBO insulating yarn, wherein the temperature is controlled at 192° C. and the insulating PBO yarn is obtained;

The PBO insulating yarn is subjected to further processing such as weaving to obtain an insulating rope. The moisture absorption rate of the insulating rope is 1.37% after being washed for 10 times and immersed for 15 minutes at 10~20 cm below water surface; when the harsh conditions of environment temperature at 30° C., relative humidity at 85%, ultraviolet wavelength at 340 nm and the irradiation smaller than or equal to 50 W/m² are simulated and kept for 150 h, the result of the accelerated aging test is that the tensile strength is reduced by 8.21%.

Example 15—Preparation of Moisture-Proofing and Quick-Drying PBO Insulating Rope 1) Stranding and twisting the PBO fiber to prepare a 12-strand loose primary PBO fiber rope.
2) Evenly mixing 0.5 kg of waterborne polyurethane/polyacrylic acid-octyl acrylate copolymer nano-emulsion prepared in example 1 with 1.5 kg of silane coupling agent KH 792 to prepare the mixed conditioning fluid, and soaking 200 kg of the 12-strand loose primary PBO fiber rope into the mixed conditioning fluid, wherein the temperature of the mixed conditioning fluid is controlled at 100° C., and the treatment time is 60 min.

3) Taking out the 12 strand loose primary PBO fiber rope from the mixed conditioning fluid, washing with water and then drying it; soaking the 12-strand loose primary PBO fiber rope into 6 kg of perfluor C6 chain waterproofing agents, and adding 2 g of C.I.Basic Yellow 28 into the perfluor C6 chain waterproofing agent, wherein the temperature of the perfluor C6 chain waterproofing agent is controlled at 128° C., and the treatment time is 30 min.
4) Baking the waterproof treated 12-strand loose primary PBO fiber rope at a high temperature to obtain the 12-strand loose primary PBO fiber insulating rope, wherein the temperature is controlled at 182° C.
5) After stabilized finish of the 12 strand loose primary PBO fiber rope, the rope is wrapped by the fiber yarn prepared in example 9 to obtain the final insulating rope.

The moisture absorption rate of the PBO fiber insulating rope is 1.08% after being washed for 10 times and immersed for 15 minutes at 15~20 cm below water surface; when the harsh conditions of environment temperature at 30° C., relative humidity at 85%, ultraviolet wavelength at 340 nm and the irradiation smaller than or equal to 50 W/m$^2$ are simulated and kept for 150 h, the result of the accelerated aging test is that the tensile strength is reduced by 5.14%.

Example 16—Preparation of Moisture-Proofing and Quick-Drying PBO Insulating Rope 1) Stranding and twisting the PBO fiber to prepare a 12 strand loose primary PBO fiber rope.
2) Evenly mixing 0.5 kg of waterborne polyurethane/polyacrylic acid-decyl acrylate nano-emulsion prepared in example 2 with 14 kg of silane coupling agent KH 792 and 10 kg of silane coupling agent KH 70 to prepare the mixed conditioning fluid, and soaking 160 kg of the 12-strand loose primary PBO fiber rope into the mixed conditioning fluid, wherein the temperature of the mixed conditioning fluid is controlled at 105° C., and the treatment time is 52 min.
3) Taking out the 12-strand loose primary PBO fiber rope from the mixed conditioning fluid, washing with water and then drying it; soaking the 12-strand loose primary PBO fiber rope into 17.6 kg of perfluor C6 chain waterproofing agent, and adding 1.6 g of C.I.Basic Yellow 24 into the perfluor C6 chain waterproofing agent, wherein the temperature of the perfluor C6 chain waterproofing agent is controlled at 130° C., and the treatment time is 44 min.
4) Baking the waterproof treated 12-strand loose primary PBO fiber rope at a high temperature to obtain the 12-strand loose primary PBO fiber insulating rope, wherein the temperature is controlled at 180° C.
5) After stabilized finish of the 12-strand loose primary PBO fiber rope, the rope is wrapped by fiber yarn prepared in example 10 to obtain the final insulating rope.

The moisture absorption rate of the PBO fiber insulating rope is 1.22%, after being washed for 10 times and immersed for 15 minutes at 15~20 cm below water surface; when the harsh conditions of environment temperature at 30° C., relative humidity at 85%, ultraviolet wavelength at 340 nm and the irradiation smaller than or equal to 50 W/m$^2$ are simulated and kept for 150 h, the result of the accelerated aging test is that the tensile strength is reduced by 8.06%.

Example 17—Preparation of Moisture-Proofing and Quick-Drying PBO Insulating Rope 1) Stranding and twisting the PBO fiber to prepare a 12-strand loose primary PBO fiber rope.
2) Evenly mixing 0.5 kg of waterborne polyurethane/polyacrylic acid nano-emulsion prepared in example 3 with 4 kg of silane coupling agent KH 570 to prepare the mixed conditioning fluid, and soaking 90 kg of the 12-strand loose primary PBO fiber rope into the mixed conditioning fluid, wherein the temperature of the mixed conditioning fluid is controlled at 125° C., and the treatment time is 58 min.
3) Taking out the 12-strand loose primary PBO fiber rope from the mixed conditioning fluid, washing with water and then drying it; soaking the 12-strand loose primary PBO fiber rope into 7.2 kg of perfluor C6 chain waterproofing agents, and adding 0.32 g of C.I.Basic Yellow 28 into the perfluor C6 chain waterproofing agents, wherein the temperature of the perfluor C6 chain waterproofing agents is controlled at 122° C., and the treatment time is 41 min.
4) Baking the waterproof treated 12-strand loose primary PBO fiber rope at a high temperature to obtain the 12-strand loose primary PBO fiber insulating rope, wherein the temperature is controlled at 250° C.
5) After stabilized finish of the 12-strand loose primary PBO fiber rope, the rope is wrapped by fiber yarn prepared in example 11 to obtain the final insulating rope.

The moisture absorption rate of the PBO fiber insulating rope is 1.17% after being washed for 10 times and immersed for 15 minutes at 15~20 cm below water surface; when the harsh conditions of environment temperature at 30° C., relative humidity at 85%, ultraviolet wavelength at 340 nm and the irradiation smaller than or equal to 50 W/m$^2$ are simulated and kept for 150 h, the result of the accelerated aging test is that the tensile strength is reduced by 4.88%.

Example 18—Preparation of Moisture-Proofing and Quick-Drying PBO Insulating Rope 1) Stranding and twisting the PBO fiber to prepare a 12-strand loose primary PBO fiber rope.
2) Evenly mixing 0.8 kg of waterborne polyurethane/poly (lauryl Alcrylate) nano-emulsion prepared in example 4 with 1.9 kg of silane coupling agent KH 5670 to prepare the mixed conditioning fluid, and soaking 90 kg of the 12-strand loose primary PBO fiber rope into the mixed conditioning fluid, wherein the temperature of the mixed conditioning fluid is controlled at 112° C., and the treatment time is 52 min.
3) Taking out the 12-strand loose primary PBO fiber rope from the mixed conditioning fluid, washing with water and then drying it; soaking the 12-strand loose primary PBO fiber rope into 16 kg of perfluor C6 chain waterproofing agent, and adding 1.53 g of C.I.Basic Yellow 24 into the perfluor C6 chain waterproofing agent, wherein the temperature of the perfluor C6 chain waterproofing agents is controlled at 110° C., and the treatment time is 45 min.
4) Baking the waterproof treated 12-strand loose primary PBO fiber rope at a high temperature to obtain the 12-strand loose primary PBO fiber insulating rope, wherein the temperature is controlled at 222° C.
5) After stabilized finish of the 12-strand loose primary PBO fiber rope, the rope is wrapped by fiber yarn prepared in example 11 to obtain the final insulating rope.

The moisture absorption rate of the PBO fiber insulating rope is 1.30% after being washed for 10 times and immersed for 15 minutes at 15~20 cm below water surface; when the harsh conditions of environment temperature at 30° C., relative humidity at 85%, ultraviolet wavelength at 340 nm and the irradiation smaller than or equal to 50 W/m² are simulated and kept for 150 h, the result of the accelerated aging test is that the tensile strength is reduced by 3.3%.

Comparative Example 1

1) Stranding and twisting the PBO filament to prepare a PBO line.
2) Washing 80 kg of the PBO lines with water and then drying it; soaking the PBO line into 4 kg of perfluor C8 chain waterproofing agent, wherein the temperature of the perfluor C8 chain waterproofing agent is controlled at 122° C., and the treatment time is 48 min.
3) Baking the waterproof treated PBO line at a high temperature, wherein the temperature is controlled at 192° C.

The PBO line is subjected to further processing such as weaving to obtain an insulating rope. The moisture absorption rate of the insulating rope is 10.37% after being washed for 10 times and immersed for 15 minutes at 15~20 cm below water surface; when the harsh conditions of environment temperature at 30° C., relative humidity at 85%, ultraviolet wavelength at 340 nm and the irradiation smaller than or equal to 50 W/m² are simulated and kept for 150 h, the result of the accelerated aging test is that the tensile strength is reduced by 35.89%.

Comparative Example 2

1) Stranding and twisting the PBO filament to prepare a PBO line.
2) Washing 80 kg of the PBO line with water and then drying it; soaking the PBO line into 4 kg of perfluor C6 chain waterproofing agent, wherein the temperature of the perfluor C6 chain waterproofing agent is controlled at 122° C. and the treatment time is 48 min.
3) Baking the waterproof treated PBO fiber line at a high temperature, wherein the temperature is controlled at 192° C.

The PBO line is subjected to further processing such as weaving to obtain an insulating rope. The moisture absorption rate of the insulating rope is 13.76% after being washed for 10 times and immersed for 15 minutes at 15~20 cm below water surface; when the harsh conditions of environment temperature at 30° C., relative humidity at 85%, ultraviolet wavelength at 340 nm and the irradiation smaller than or equal to 50 W/m² are simulated and kept for 150 h, the result of the accelerated aging test is that the tensile strength is reduced by 23.21%.

In summary, the PBO insulation ropes treated with the fiber surface treatment composition of the present invention are significantly improved in water repellency after repeated laundering and anti-aging performance, compared with the PBO insulated ropes treated with the water repellant only of the comparative examples. Thus, the fiber surface treatment composition of the present invention has an unexpected technical effect on improving the water repellency, the ultraviolet resistance and the aging resistance of the fiber. The insulation fiber and the insulation ropes which are surface-treated by the composition thoroughly break through the predicament and the barrier of the existing technology, and their storage and transportation is more peace of mind, long-term use more secure, and can be used for a long time in live working under high humidity environment.

Those skilled in the field should understand that the discussion on any above embodiment is illustrative instead of implying that the scope (including claims) of the invention is limited to these examples; based on the idea of the invention, the technical characteristics of the above embodiments or different embodiments can be combined, the steps can appear according to any sequence, and there shall be many variants of different aspects of the invention as described above, which however are not provided in details for the purpose of conciseness. Therefore, any omission, modification, equivalent replacement and improvement within the sprit and principle of the invention shall be included in the protection scope of the invention.

The invention claimed is:

1. A fiber surface treatment composition, wherein the composition comprises a silane coupling agent, a polymer and a waterproofing agent, wherein the polymer comprises a copolymer of polyurethane/polyacrylics, wherein the polyacrylics is selected from the group consisting of polyacrylic acid, polyacrylates and acrylic acid-acrylic ester copolymers, and the polymer has a core-shell structure, wherein the core is comprised of polyurethane and the shell is comprised of polyacrylics.

2. The composition according to claim 1, wherein if the polyacrylics is selected from polyacrylates or acrylic acid-acrylic ester copolymers, the acrylic ester-forming alcohol in the acrylate monomer is a linear alcohol having a carbon chain with a length of no less than 8 carbon atoms.

3. The composition according to claim 2, wherein the acrylate monomer is selected from at least one of octyl acrylate, decyl acrylate, and lauryl acrylate.

4. The composition according to claim 1, wherein the polymer comprises a nano-particle having a particle size in the range of 5 to 200 nm.

5. The composition according to claim 1, wherein the polymer comprises a polymer emulsion.

6. The composition according to claim 1, wherein the diisocyanate monomer forming the polyurethane is selected from isophorone diisocyanate.

7. The composition according to claim 1, further comprising a cationic dye selected from at least one of C. I. Basic Yellow 24 and C.I. Basic Yellow 28.

8. An insulated fiber, characterized in that the insulated fiber is attached with the composition according to claim 1.

9. The insulated fiber according to claim 8, wherein the fiber is selected from Poly-p-phenylene benzobisoxazazole (PBO) fiber.

10. The insulated fiber according to claim 8, wherein the composition on the surface of the insulating fiber comprises 1 to 20% by weight of the insulating fiber.

11. The insulated fiber according to claim 8, wherein the waterproofing agent on the surface of the insulating fiber comprises 1 to 18% by weight of the insulating fiber.

12. A method for preparing an insulated fiber, comprising the following steps:
   1) contacting the composition according to claim 1 with the fiber to make the composition to be adhered to the surface of the fiber; and
   2) baking the fiber to which the composition is adhered; wherein the fiber comprises polyparaphenylene benzobisoxazole (PBO) fiber.

13. The method of claim 12, wherein the step of contacting comprises impregnating the fiber sequentially in the silane coupling agent, the polymer and the waterproofing agent.

14. The method of claim 12, wherein the step of contacting comprises impregnating the fiber in a mixture of the silane coupling agent and the polymer, and then washing, drying and finally immersing the fiber in the waterproofing agent.

\* \* \* \* \*